(12) United States Patent
Szurek et al.

(10) Patent No.: US 9,612,593 B2
(45) Date of Patent: Apr. 4, 2017

(54) METHODS AND APPARATUS TO CONFIGURE A PROCESS CONTROL DEVICE

(71) Applicant: Bristol, Inc., Watertown, CT (US)

(72) Inventors: Scott Szurek, Marshalltown, IA (US); Richard Vanderah, Marshalltown, IA (US)

(73) Assignee: BRISTOL, INC., Houston, TX (US)

( * ) Notice: Subject to any disclaimer, the term of this patent is extended or adjusted under 35 U.S.C. 154(b) by 490 days.

(21) Appl. No.: 13/889,052

(22) Filed: May 7, 2013

(65) Prior Publication Data

US 2013/0304234 A1    Nov. 14, 2013

Related U.S. Application Data

(60) Provisional application No. 61/644,946, filed on May 9, 2012.

(51) Int. Cl.
*G05B 19/02* (2006.01)
*G05B 19/042* (2006.01)

(52) U.S. Cl.
CPC ......... *G05B 19/02* (2013.01); *G05B 19/0426* (2013.01); *G05B 2219/2222* (2013.01); *G05B 2219/25428* (2013.01)

(58) Field of Classification Search
CPC .. G05B 19/02; G05B 19/042; G05B 19/0426; G05B 2219/2222
USPC .......................................................... 700/28
See application file for complete search history.

(56) References Cited

U.S. PATENT DOCUMENTS

| | | | | |
|---|---|---|---|---|
| 5,263,155 A | * | 11/1993 | Wang | ............................ 707/695 |
| 5,444,705 A | * | 8/1995 | Olnowich | .......... H04Q 11/0478 370/388 |
| 5,945,993 A | * | 8/1999 | Fleischmann | .......... H05B 37/02 715/771 |
| 5,980,078 A | * | 11/1999 | Krivoshein | ...... G05B 19/41865 700/1 |

(Continued)

FOREIGN PATENT DOCUMENTS

| | | |
|---|---|---|
| CN | 1702582 | 11/2005 |
| CN | 102298372 | 12/2011 |

(Continued)

OTHER PUBLICATIONS

Javaid, Usman, Outlook 2010: Mark Items as Read When Viewed in Reading Pane, Apr. 17, 2010 (<<http://www.addictivetips.com/microsoft-office/outlook-2010-mark-items-as-read-when-viewed-in-reading-pane/>>, accessed Jun. 26, 2015).*

(Continued)

*Primary Examiner* — Kenneth M Lo
*Assistant Examiner* — Michael J Huntley
(74) *Attorney, Agent, or Firm* — Hanley, Flight & Zimmerman, LLC (57) ABSTRACT

Example methods and apparatus are provided for configuring a process control device. An example method includes implementing a first configuration at the process control device based on a first configuration request. The example method includes setting a configuration flag. The configuration flag indicates the first configuration is being implemented. The example method includes denying a second configuration request while the configuration flag is set.

24 Claims, 6 Drawing Sheets

(56) References Cited

U.S. PATENT DOCUMENTS

| | | | | |
|---|---|---|---|---|
| 6,211,797 | B1* | 4/2001 | Kimura | H04B 10/11 340/3.1 |
| 6,230,235 | B1* | 5/2001 | Lu | G06F 9/5016 365/222 |
| 6,501,995 | B1* | 12/2002 | Kinney et al. | 700/1 |
| 6,859,787 | B2* | 2/2005 | Fisher et al. | 705/26.81 |
| 7,596,510 | B2 | 9/2009 | Fisher et al. | |
| 8,671,460 | B1* | 3/2014 | Havekost et al. | 726/30 |
| 8,849,431 | B2* | 9/2014 | Thomson et al. | 700/87 |
| 8,896,603 | B2* | 11/2014 | Hammack et al. | 345/440 |
| 8,996,754 | B2* | 3/2015 | Hildebran et al. | 710/19 |
| 2005/0033886 | A1* | 2/2005 | Grittke | H04L 69/329 710/107 |
| 2005/0262281 | A1* | 11/2005 | Nayak | G06F 13/364 710/244 |
| 2006/0047778 | A1* | 3/2006 | Adams | H04L 67/125 709/217 |
| 2006/0064512 | A1* | 3/2006 | Shepard | G05B 19/042 710/8 |
| 2007/0100584 | A1* | 5/2007 | August | G06Q 10/06 702/184 |
| 2008/0052386 | A1* | 2/2008 | Johnson | G05B 19/042 709/223 |
| 2008/0189340 | A1* | 8/2008 | Blea | G06F 17/30575 |
| 2009/0292403 | A1* | 11/2009 | Howell | G01R 22/10 700/292 |
| 2010/0305720 | A1* | 12/2010 | Doll et al. | 700/86 |
| 2010/0305721 | A1* | 12/2010 | Kostadinov et al. | 700/87 |
| 2011/0004685 | A1* | 1/2011 | De Groot | G05B 19/0425 709/225 |
| 2011/0093098 | A1* | 4/2011 | Kostadinov et al. | 700/87 |
| 2011/0125927 | A1* | 5/2011 | Shen et al. | 710/3 |
| 2011/0296330 | A1* | 12/2011 | Shi | G05B 19/4184 715/771 |
| 2012/0078383 | A1* | 3/2012 | Takahashi | 700/7 |
| 2012/0089239 | A1* | 4/2012 | Sentgeorge et al. | 700/2 |
| 2012/0198226 | A1* | 8/2012 | Wimmer | G06F 21/57 713/100 |
| 2012/0239172 | A1* | 9/2012 | Nishiyama et al. | 700/86 |
| 2012/0265322 | A1* | 10/2012 | Hildebran | G05B 19/056 700/9 |
| 2012/0296448 | A1* | 11/2012 | Balentine et al. | 700/19 |
| 2013/0131841 | A1* | 5/2013 | Furumoto et al. | 700/19 |

FOREIGN PATENT DOCUMENTS

| | | |
|---|---|---|
| EP | 2341406 | 7/2011 |
| WO | 2012047654 | 4/2012 |

OTHER PUBLICATIONS

Maple Systems, Inc., "PLC Setup and Configuration—Maple Systems Touchscreen HMI," May 24, 2010 (accessed Jun. 29, 2015; hereinafter referred to as Maple).*

Patent Cooperation Treaty, "International Preliminary Report on Patentability," issued in connection with PCT Patent Application No. PCT/US2013/040342, issued on Nov. 11, 2014, 8 pages.

Patent Cooperation Treaty, "Written Opinion," issued in connection with PCT Patent Application No. PCT/US2013/040342, issued on Aug. 19, 2013, 7 pages.

Patent Cooperation Treaty, "International Search Report," issued in connection with PCT Patent Application No. PCT/US2013/040342, issued on Aug. 19, 2013, 4 pages.

State Intellectual Property Office of China, "Notification of the First Office Action," issued in connection with Chinese Patent Application No. 201310262743.1, dated Oct. 19, 2016, 20 pages.

* cited by examiner

METHODS AND APPARATUS TO CONFIGURE A PROCESS CONTROL DEVICE

RELATED APPLICATION

This patent claims priority to U.S. Provisional Application Ser. No. 61/644,946, entitled "Methods and Apparatus to Configure a Process Control Device," which was filed on May 9, 2012, and is hereby incorporated herein by reference in its entirety.

FIELD OF THE DISCLOSURE

This disclosure relates generally to process control environments and, more particularly, to methods and apparatus to configure a process control device.

BACKGROUND

Generally, output devices (e.g., thermometers, pressure gauges, concentration gauges, fluid level meters, flow meters, vapor sensors, valve positioners, etc.) in a process control system are used to monitor and/or control a process. The output devices often include one or more sensors to acquire information related to the process. The information is typically transmitted to a controller. The information acquired by output devices may be analyzed via the controller and used to control input devices (e.g., valves, pumps, fans, heaters, coolers, mixers, etc.) to control the process.

SUMMARY

An example method to configure a process control device includes implementing a first configuration based on a first configuration request. The example method includes setting a configuration flag, the configuration flag indicating the first configuration is being implemented. The example method includes receiving a second configuration request and denying the second configuration request while the configuration flag is set. When the first configuration is complete, the example method includes removing the configuration flag, storing configuration information based on the first configuration, and setting an information flag, the information flag indicating that the configuration information has been stored. The example method includes receiving a request for the configuration information based on the information flag. The example method includes returning the configuration information in response to the request and removing the information flag.

An example method includes implementing a first configuration at the process control device based on a first configuration request. The example method includes setting a configuration flag. The configuration flag indicates the first configuration is being implemented. The example method includes denying a second configuration request while the configuration flag is set.

An example process control device includes a data manager to implement a first configuration based on a first configuration request. The example data manager is to set a configuration flag. The configuration flag indicates the first configuration is being implemented. The example data manager is to deny a second configuration request while the configuration flag is set.

DETAILED DESCRIPTION

Example methods and apparatus disclosed herein enable process control devices (e.g., output devices such as transmitters) to be configured and/or calibrated locally and/or via a network host system. In prior process control systems, a single connection port was provided on output devices and, thus, the output devices could be connected either locally or to the host system (e.g., one at a time). In such prior systems, if an output device was to be configured (or reconfigured) and the host system could not provide such configuration, the connection to the host system would be removed and a local configuration tool would be directly connected (e.g., on-site) to the output device to perform the desired configuration. In such prior systems, a field technician would go to each output device in a process control system and disconnect each output device from the host system to perform a local configuration of that device.

The example methods and apparatus disclosed herein enable an output device to be communicatively coupled to both a local device and a network host system and enable configuration of the output device both locally and via the network host system without disconnecting either the local device or the network host system. Further, the example methods and apparatus disclosed herein enable information (e.g., configuration and/or calibration information) to be shared between the local device and the network host system. For example, if a calibration is performed on the output device by the local device, calibration information (e.g., updated calibration data) may be stored at the output device and provided to the network host system. The network host system may then use the updated calibration data in any process control calculations and/or functions being performed at the network host system. Additionally, if a calibration is implemented by either the local device or the host system, that calibration is completed before allowing a second calibration to be implemented (e.g., by the local device or the host system that did not implement the original calibration).

Figure 1:
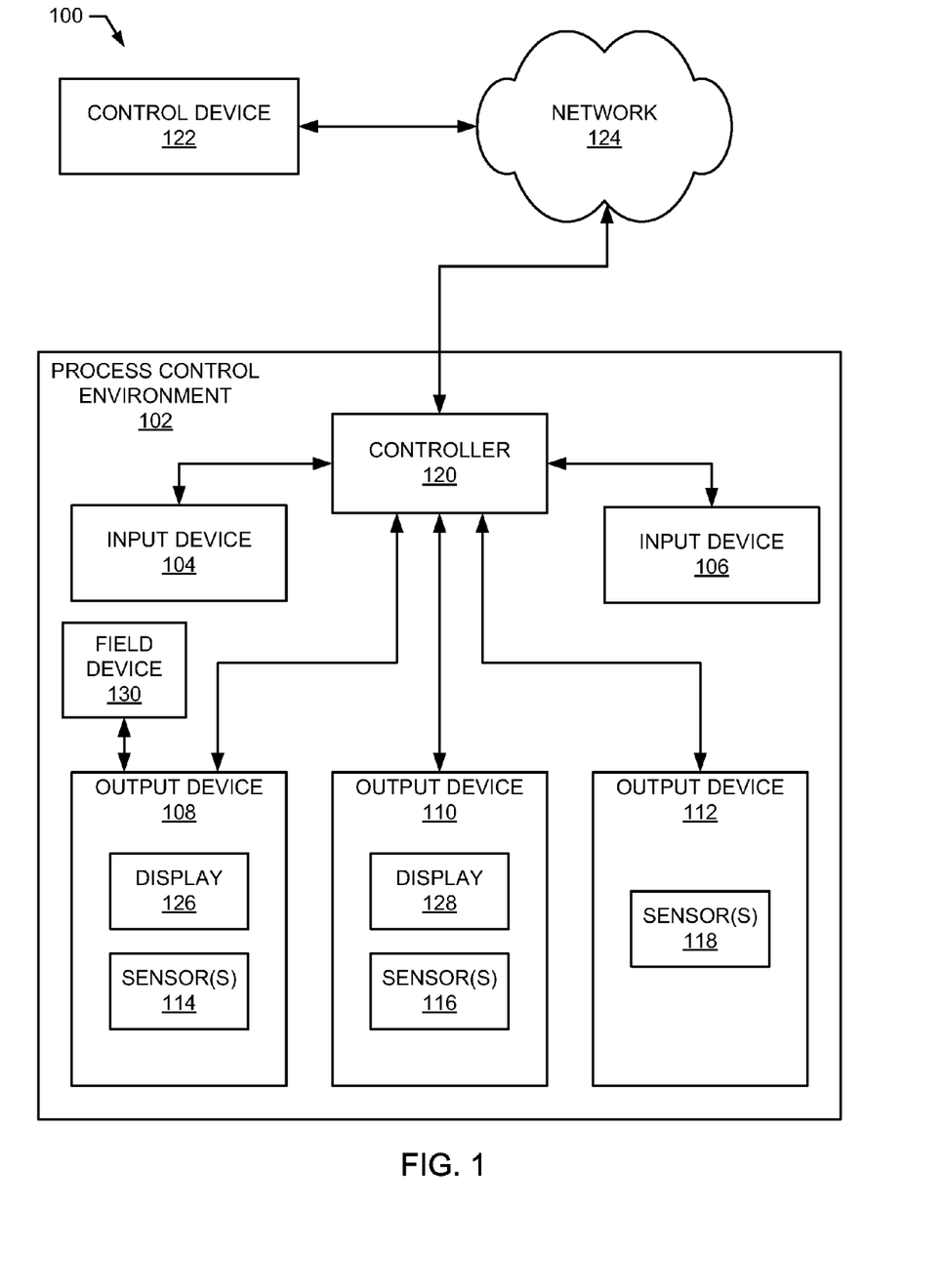
FIG. 1 illustrates an example process control system that may be used to implement the example methods and apparatus disclosed herein.

FIG. 1 illustrates an example process control system 100 that may be used to implement the example apparatus and methods disclosed herein. The process control system 100 of the illustrated example is used to implement, monitor, and/or control a process within a process control environment 102. The process control environment 102 of the illustrated example includes an input device 104 and an input device 106. The input devices 104 and 106 of the illustrated example are used to implement and/or control a process within the process control environment 102. The input devices 104 and 106 may be, for example, valves, pumps, fans, heaters, coolers, mixers, and/or other devices.

The process control environment 102 of the illustrated example also includes an output device 108, an output device 110, and an output device 112 (collectively referred to herein as the output devices 108-112). The output devices 108-112 of the illustrated example are used to monitor the process within the process control environment 102. The output devices 108-112 may be, for example, thermometers, pressure gauges, concentration gauges, fluid level meters, flow meters, vapor sensors, valve positioners, and/or any other suitable devices that may acquire, generate, store, analyze, process, and/or transmit information. The output devices 108-112 of the illustrated example include sensor(s) 114, 116, and 118, respectively, to acquire information and/or data related to the process (e.g., measured process information, environmental information, and/or input device information, etc.). While the process control environment 102 of the illustrated example includes input devices 104 and 106 and output devices 108-112, any number and/or type of process control devices may additionally or alternatively be used.

The input devices 104 and 106 and the output devices 108-112 are communicatively coupled to a controller 120. The controller 120 of the illustrated example transmits information and/or instructions to the input devices 104 and 106 to control the process and receives and/or collects information transmitted by the output devices 108-112. The controller 120 is coupled to the input devices 104 and 106 and the output devices 108-112 via a data bus (e.g., Standard Asynchronous/Synchronous Protocol (BSAP), Highway Addressable Remote Transducer Protocol (HART®), 3095 Modbus®, MVS205 Modbus®) and/or a local area network (LAN). The controller 120 may be, for example, a DeltaV™ controller, a flow computer, a host, and/or any other local process control device. In some examples, the input devices 104 and 106 and/or the output devices 108-112 are communicatively coupled to the controller 120 via a wireless connection.

In the illustrated example, the controller 120 generates notifications, alert messages, and/or other information related to the process and communicates the notifications, alert messages, and/or other information to a control device 122 via a network 124. The control device 122 of the illustrated example is used to further monitor and/or control the process within the process control environment 102. In some examples, the control device 122 generates notifications, alert messages, and/or other information related to the process and communicates the information to the controller 120 via the network 124. The control device 122 may be, for example, a computer, a host, a handheld wireless device, a supervisory control system, and/or any other suitable control device. In some examples, the control device 122 is communicatively coupled directly to the example output devices 108-112.

The example controller 120 and/or the example control device 122 transmit instructions to the input devices 104 and 106 to control the process. In the illustrated example, the controller 120 and/or the control device 122 transmit instructions, commands, and/or information to the output devices 108, 110 and 112 and receive information transmitted by the output devices 108, 110 and 112. In some examples, the information transmitted by the controller 120 and/or the control device 122 to the output devices 108, 110 and 112 includes information such as input device information (e.g., pump characteristics, valve characteristics, etc.), output device information (e.g., sensor characteristics, the location of the output device, type of output device, name of the output device (e.g., a serial number), damping information, filtering information, etc.), ambient environment information (e.g., temperatures, etc.), process fluid information, flow passageway parameters and/or characteristics, the process control environment location, a process facility name and/or location, notifications, alarm information, and/or any other information.

In some examples, the controller 120 and/or the control device 122 analyze the information received from the output devices 108, 110 and 112. In the illustrated example, one or more of the output devices 108, 110 and 112 acquires information such as, for example, a differential pressure, a static pressure, and a temperature of a process fluid, etc. Based on the information, the example controller 120 and/or the example control device 122 determines (e.g., calculates) values such as fluid density, fluid velocity, fluid viscosity, beta ratio, gas expansion, discharge coefficient, velocity of approach, Reynolds Number, mass flow rate, volumetric flow rate, energy flow rate, totalized flow rate, etc. In other examples, the output devices 108, 110 and 112 acquire other information and/or the controller 120 and/or the control device 122 determines other values.

Although one controller 120 and one control device 122 are shown in FIG. 1, one or more additional controllers 120 and/or process control devices 122 may be included in the example system 100. In the illustrated example, the controller 120 is located in the process control environment 102 (e.g., in a workstation, a control room, and/or any other suitable location in the process control environment 102) and the control device 122 is located outside of the process control environment 122 (e.g., in another process control facility, on a remote worker's person, an offsite facility, etc.). However, the controller 120 and/or the control device 122 may be located within or outside the process control environment 102.

The network 124 may be implemented using any type of public and/or private network such as, but not limited to, the Internet, a telephone network (e.g., the plain old telephone system (POTS) network), a local area network ("LAN"), a cable network, a cellular network, and/or a wireless network. To enable communication via the network 124, the controller 120 of the illustrated example includes a communication interface that enables connection to an Ethernet, a digital subscriber line ("DSL"), a telephone line, a coaxial cable, and/or any wireless connection, etc.

In the illustrated example, the output devices 108 and 110 include a display 126 and 128, respectively, and the output device 112 does not include such a similar display. Information acquired by the output devices 108-112, information from the controller 120, information from the control device 122, values determined by the controller 120 and/or the control device 122, and/or any other suitable information may be displayed on one or more of the example displays 126 and 128 of the output devices 108 and 110.

In the illustrated example, the example output device 108 is communicatively coupled to a portable field device 130. The portable field device of the illustrated example is used to calibrate and/or configure the example output device 108 and/or transmit information to the output device 108. Information transmitted to the output device 108 may be, for example, static parameters such as fluid type, fluid flow passageway parameters and/or characteristics, location of the output device 108, type of the output device 108, name of the output device 108 (e.g., a serial number), sensor(s) 114 characteristics, output device 108 damping information, output device 108 filtering information, process control environment 102 location, process facility name and/or location, notifications, alarm information, and/or any other suitable information. In some examples, the portable field device 130 receives and stores (e.g., via a nonvolatile memory) the information transmitted by the example output device 108. In some examples, an operator manually communicatively couples the portable field device 130 to the output device 108 (e.g., via a connector). The field device 130 may be, for example, a Fisher® 475 Field Communicator, a laptop, a smartphone, etc. Information is communicated between the field device 130 and the output device 108 via any suitable protocol (e.g., BSAP, HART®, 3095 Modbus®, MVS205 Modbus®, etc.). While the field device 130 of the illustrated example is coupled to the output device 108, the field device 130 may be coupled to any of the process control devices of the process control environment 102.

In the illustrated example, the output device 108 may be communicatively coupled to both the field device 130 and the controller 120 and, thus, the output device may be configured both locally (e.g., by the field device 130) and via a host system (e.g., the by the controller 120 and/or the control device 122) without disconnecting either the field device 130 or the controller 120. If, for example, a calibration is implemented by either the field device 130 or the controller 120, that calibration is completed before allowing another calibration to be implemented by the other of the field device 130 or the controller 120. In the illustrated example, information (e.g., configuration and/or calibration information) may be shared between the field device 130 and the controller 120. For example, if a calibration is performed on the output device 108 by the field device 130, calibration information (e.g., updated calibration data) may be stored at the output device 108 and provided to the controller 120. The controller 120 may communicate the updated calibration data to the control device 122. The controller 120 and/or the control device 122 may then use the updated calibration data in any process control calculations and/or functions being performed to control the process control environment 102.

Figure 2:
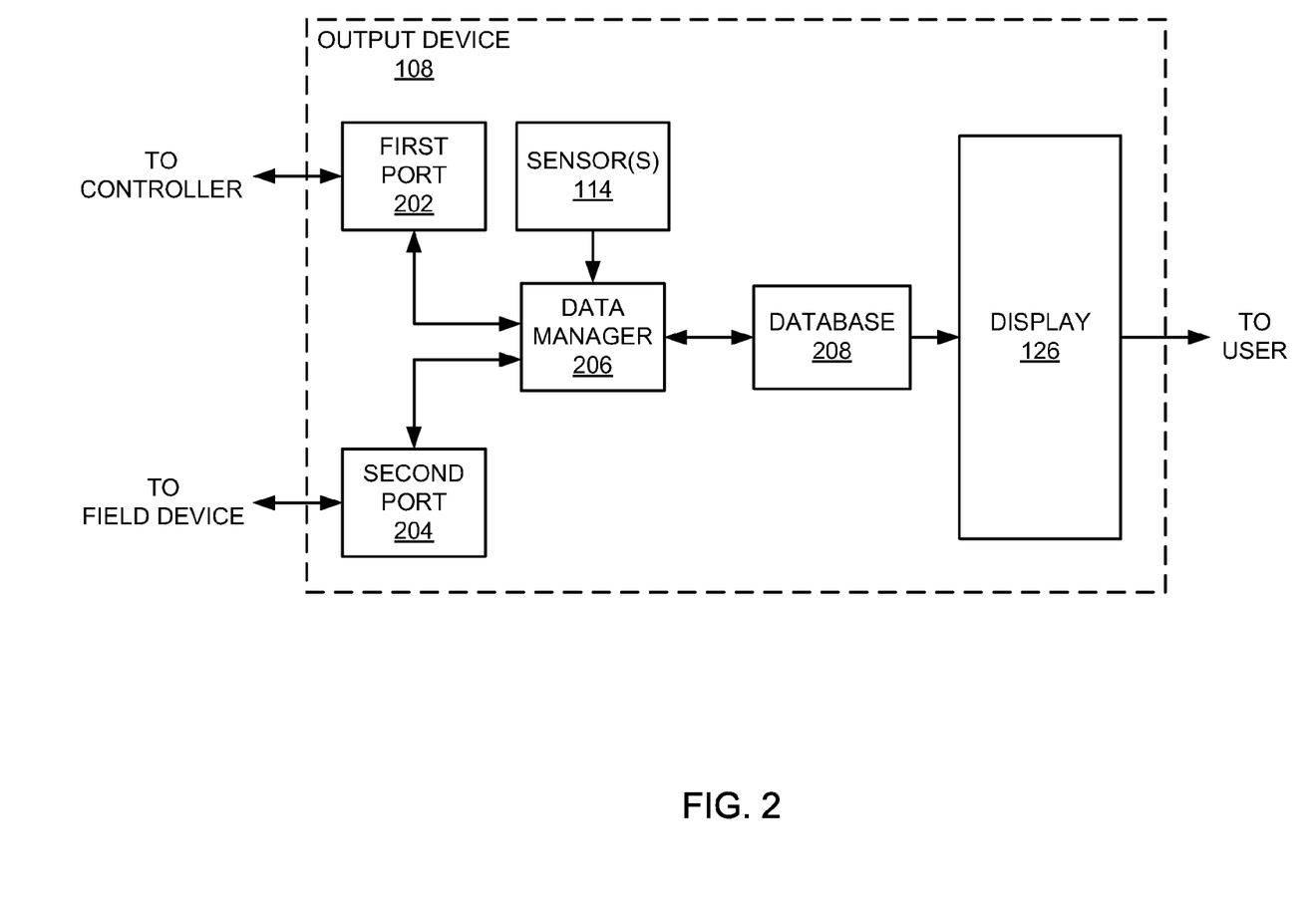
FIG. 2 is a block diagram of an example implementation of the output device of FIG. 1.

FIG. 2 is a block diagram of an example implementation of the example output device 108 of FIG. 1. The output device 108 of the illustrated receives configuration and/or calibration information from both a network host (e.g., the controller 120 and/or the control device 122 of FIG. 1) and a local tool (e.g., the portable field device 130). In the illustrated example, the output device 108 includes a first port 202, a second port 204, a data manager 206, a database 208, the sensor(s) 114, and the display 126.

The example output device 108 is communicatively coupled to the controller 120 and/or the control device 122 via the first port 202, and the example output device 108 is communicatively coupled to the portable field device 130 via the second port 204. The first port 202 and the second port 204 enable both the field device 130 and the controller 120 to be connected to the output device 108 at the same time. In some examples, an operator manually couples the portable field device 130 to the output device 108 (e.g., via a connector). In other examples, the portable field device 130 is wirelessly communicatively coupled to the output device 108.

The example sensor(s) 114 acquire information related to a process being monitored by the output device 108. In some examples, the sensor(s) 114 are pressure gauges, temperature sensors, resistance temperature detectors, and/or any other suitable sensors. In some such examples, the sensor(s) 114 acquire information such as, for example, fluid differential pressure, static fluid pressure, and/or fluid temperature.

The example data manager 206 of FIG. 2 analyzes, processes, and/or stores information. In the illustrated example, the data manager 206 analyzes, processes, and/or stores the information acquired from the sensor(s) 114, from the controller 120 and/or the control device 122 at the first port 202, and/or from the portable field device 130 at the second port 204. In some examples, the data manager 206 organizes the information by generating one or more tables in the database 208, replacing information stored in the database 208 with other information, tagging the information (e.g., with an identifier, time, location, etc.), and/or performing any other desired action.

In some examples, based on the information acquired from the example sensor(s) 114, the data manager 206 determines if the sensor(s) 114 are working properly. If the example sensor(s) 114 are not working properly, the data manager 206 generates a notification, an alert, and/or an alarm. The example data manager 206 generates other notifications, alerts, and/or alarms in response to other events.

The example data manager 206 responds to requests, instructions, and/or commands from the portable field device 130, the controller 120, and/or the control device 122. The requests, instructions, and/or commands may include requests for information (e.g., information acquired from the sensor(s) 114), instructions to initiate a calibration of the output device 108, requests for calibration information, instructions to configure the output device, requests for configuration information, etc. If the data manager 206 receives, for example, instructions to initiate a calibration of the output device 108, the data manager 206 initiates calibration of the output device 108. In response to the requests, instructions, and/or commands, the data manager 206 transmits the desired information to one or more of the portable field device 130, the controller 120, or the control device 122. In some examples, the data manager 206 transmits information to the controller 120 and/or the control device 122 without receiving a command from the local controller 120 and/or the control device 122 (i.e., automatically).

The example database 208 may be used to store the information acquired via the sensor(s) 114 and/or data manager 206 and/or any other information. In some examples, the database 208 stores some of the information (e.g., dynamic information such as, for example, information acquired via the sensor(s) 114, ambient environment conditions, values calculated based on the information acquired via the sensor(s) 114, etc.) separately from other information (e.g., static information such as, for example, fluid characteristics, output device location, output device filtering information, output device damping information, sensor material information, etc.). The database 208 may also include a timestamper to timestamp the information.

The display 126 of the illustrated example displays information collected, analyzed, and/or generated by the sensor(s) 114, the controller 120, the control device 122, the portable field device 130, the data manager 206, and/or database 208. In some examples, the display 126 is a liquid crystal display (LCD). The data manager 206, the controller 120, the control device 122, and/or the portable field device 130 determine which information is displayed via the display 126. In the illustrated example, the controller 120, the control device 122, and/or the portable field device 130 send a command to the data manager 206 to display information acquired via the sensor(s) 114 such as, for example, a pressure differential of a fluid, a static pressure of the fluid, and/or a temperature of the fluid. As a result, the pressure differential, the static pressure, and the temperature are displayed via the display 126, thereby enabling an operator located at or near the example output device 108 to visually monitor the process.

In operation, the controller 120 and/or the control device 122 may send configuration and/or calibration information to the data manager 206 and poll the data manager 206 for information (e.g., status flags) via the first port 202. The field device 130 may send configuration and/or calibration information to the data manager 206 and poll the data manager 206 for information (e.g., status flags) via the second port 204. Configuration information is data that may be set initially (e.g., when a control process is initiated) and may change relatively infrequently. Configuration information may include, for example, a characteristic of the sensor(s) 114. Calibration information may initiate a calibration of the output device 108, may be used to change existing calibration information of the output device 108, may be used to verify existing calibration information of the output device 108, etc.

If a configuration and/or calibration is implemented by one of the controller 120 or the field device 130 (e.g., a request and/or information is sent to the data manager 206), the data manager 206 executes the configuration and/or calibration before initiating another configuration and/or calibration (e.g., requested by the other of the controller 120 or the field device 130). For example, calibration may be time-sensitive and, thus, the data manager 206 executes one calibration before initiating another. The data manager 206 may execute any other operation (e.g., any other time-sensitive operation) before implementing another requested operation.

To enable a configuration and/or calibration to be executed prior to implementing another configuration and/or calibration, the data manager 206 sets a flag (e.g., a pending calibration flag) to indicate that a configuration and/or calibration is currently being executed. In some examples, the controller 120 and/or the field device 130 poll the data manager 206 for status flags periodically (e.g., every one second). If the controller 120 and/or the field device 130 see a pending calibration flag, for example, the controller 120 and/or the field device 130 may wait to send a configuration and/or calibration request until the pending calibration flag is removed. In some examples, if a request to initiate another configuration and/or calibration is received while the pending calibration flag is set, the data manager 206 will deny the configuration and/or calibration. When the configuration and/or calibration is complete, the data manager 206 removes the pending calibration flag to allow additional configurations and/or calibrations to be implemented.

Configuration and/or calibration data (e.g., configuration data and/or results of a calibration) is stored in the database 208 once the configuration and/or calibration is complete. Along with the configuration and/or calibration data, the database 208 may store an identifier identifying which device (e.g., the controller 120 or the field device 130) last updated the data. For example, the database 208 may store an identifier of the field device 130 with calibration data indicating that the calibration data was collected in response to a calibration initiated by the field device 130. The data manager 206 then sets another flag (e.g., an updated information flag) to indicate to the controller 120 and/or the field device 130 that updated configuration and/or calibration information has been generated and/or stored. The updated information flag may also indicate which device (e.g., the controller 120 or the field device 130) initiated the configuration and/or calibration that generated the new information. The controller 120 and/or the field device 130 may poll the status manager 206 for status flags and see the updated information flag. The controller 120 and/or the field device 130 may then send a request to the data manager 206 for the updated information. When the data manager 206 receives a request for the updated information from the controller 120 and/or the field device 130, the data manager 206 obtains the updated information from the database 208 and sends the requested updated information to the controller 120 and/or the field device 130. In some examples, the updated information is sent to the controller 120 and/or the field device 130 without receiving a request for such updated information (e.g., automatically). Once the updated information has been sent to the controller 120 and/or the field device 130, the data manager 206 removes the updated information flag. Passing the updated information between the controller 120 and the field device 130 enables the configuration and/or calibration information to be synchronized between the field device 130 and the controller 120. For example, the controller 120 is provided with calibration information implemented at the output device 108 by the field device 130 so that the calibration information may be used for other control process calculations and/or functions performed at the controller 120.

The data manager 206 may set a priority port such that information received at one of the first port 202 or the second port 204 overrides the other of the first port 202 or the second port 204. For example, if the field device 130 is set as the priority port by the data manager 206, a calibration initiated by the controller 120 may be denied, configuration information sent from the controller 120 may not be implemented at the output device 108, etc.

While an example output device 108 has been illustrated in FIG. 2, one or more of the elements, processes and/or devices illustrated in FIG. 2 may be combined, divided, re-arranged, omitted, eliminated and/or implemented in any other way. Further the example first port 202, the second port 204, the data manager 206, the database 208, the sensor(s) 114, the display 126, and/or, more generally, the example output device 108 of FIG. 2 may be implemented by hardware, software, firmware and/or any combination of hardware, software and/or firmware. Thus, for example, any of the example first port 202, the second port 204, the data manager 206, the database 208, the sensor(s) 114, the display 126, and/or, more generally, the example output device 108 of FIG. 2 could be implemented by one or more circuit(s), programmable processor(s), ASIC(s), PLD(s) and/or FPLD(s), etc. Further still, the example output device 108 of FIG. 2 may include one or more elements, processes and/or devices in addition to, or instead of, those illustrated in FIG. 2, and/or may include more than one of any or all of the illustrated elements, processes and devices.

Figure 3:
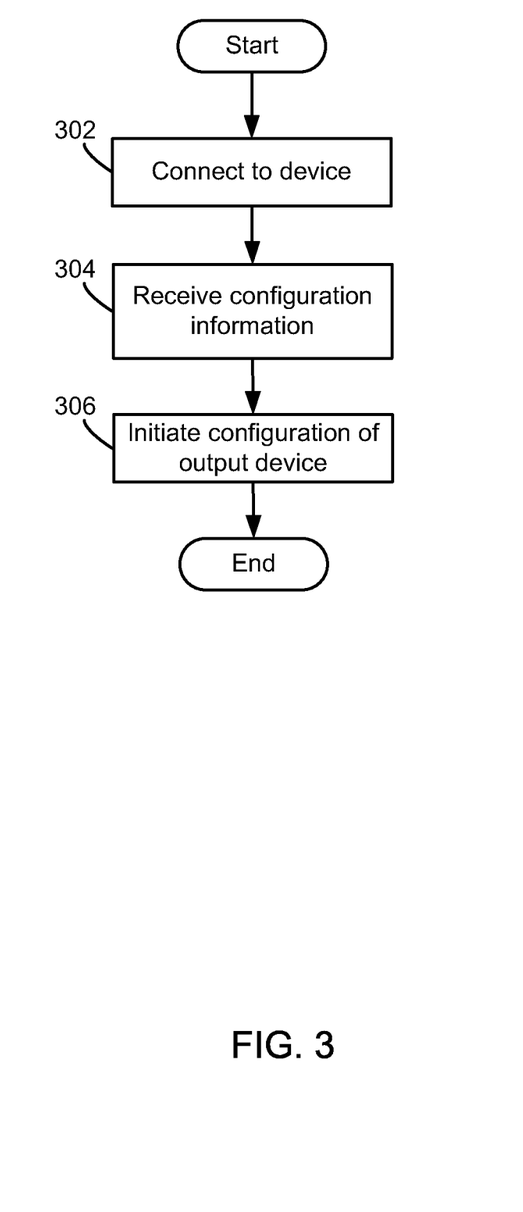
FIG. 3 is a flow diagram of an example method of configuring the example output device of FIG. 2.
Figure 4:
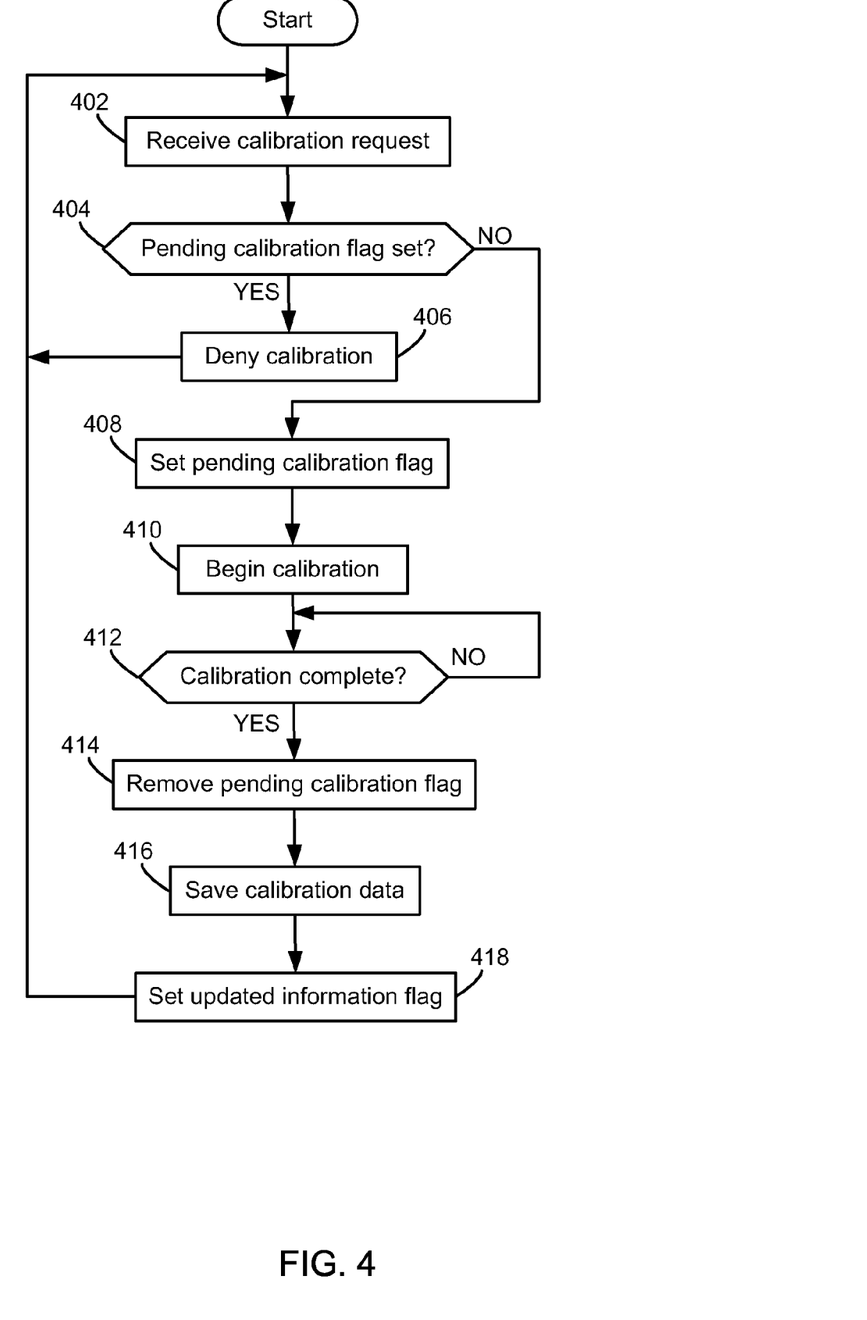
FIG. 4 is a flow diagram of an example method of calibrating the example output device of FIG. 2.
Figure 5:
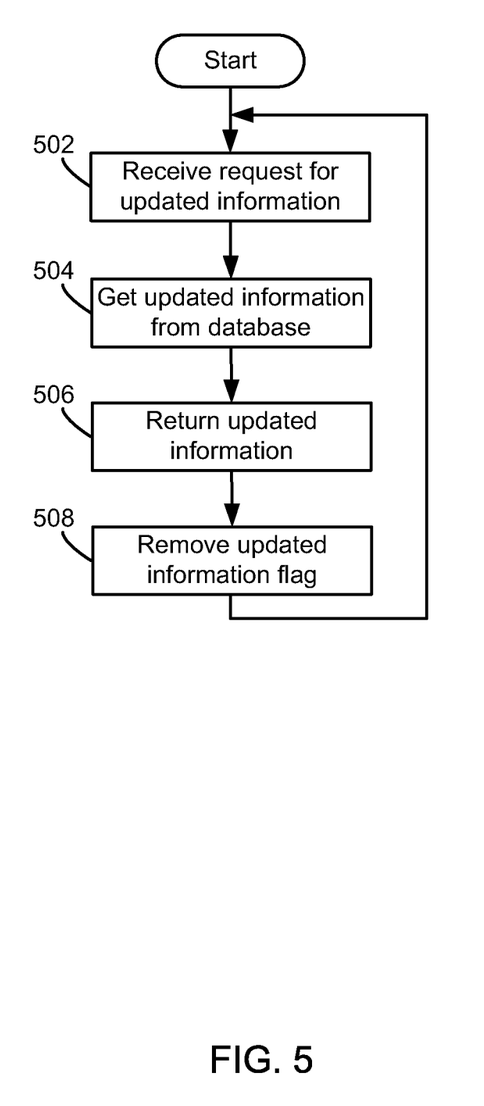
FIG. 5 is a flow diagram of an example method of providing calibration information from the example output device of FIG. 2.

Flowcharts representative of example processes or methods that may be implemented by the example first port 202, the second port 204, the data manager 206, the database 208, the sensor(s) 114, the display 126, and/or, more generally, the example output device 108 of FIG. 2 are shown in FIGS. 3, 4, and 5. In these examples, the example methods may comprise a program for execution by a processor such as the processor 612 shown in the example processor platform 600 discussed below in connection with FIG. 6. The program may be embodied in software stored on a tangible computer readable storage medium such as a compact disc read-only memory ("CD-ROM"), a floppy disk, a hard drive, a DVD, Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3, 4, and 5, many other methods of implementing the example output device 108 may alternatively be used. For example, the order of execution of the blocks may be changed, and/or some of the blocks described may be changed, eliminated, or combined.

As mentioned above, the example methods of operation of FIGS. 3, 4, and/or 5 may be implemented using coded instructions (e.g., computer readable instructions) stored on a tangible computer readable storage medium such as a hard disk drive, a flash memory, a read-only memory ("ROM"), a CD, a DVD, a cache, a random-access memory ("RAM") and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3, 4, and/or 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 3 is a flow diagram of an example method of configuring the example output device 108 of FIG. 2. Initially, the output device 108 is connected to the controller 122 and/or the field device 130 via the first port 202 and/or the second port 204 (block 302). The data manager 206 receives configuration information (e.g., a characteristic of the sensor(s) 114) from the controller 122 and/or the field device 130 via the first port 202 and/or the second port 204 (block 304). The data manager 206 initiates configuration of the output device 108 based on the configuration information (block 306). To initiate configuration, the data manager 206 may store the configuration in the database 208, may adjust a setting on the sensor(s) 114, may perform a control process calculation, etc. The process then ends.

FIG. 4 is a flow diagram of an example method of calibrating the example output device 108 of FIG. 2. Initially, the data manager 206 receives a calibration request from one of the controller 120 or the field device 130 (block 402). The data manager 206 then determines if a pending calibration flag is set (block 404). The pending calibration flag indicates that a calibration is currently being executed. If the pending calibration flag is set, the data manager 206 denies the calibration request (block 406). When the data manager 206 denies the calibration request, the data manager 206 does not execute the calibration at the output device 108. The data manager 206 may additionally send an error message to the controller 120 or the field device 130 that requested the calibration indicating that the calibration will not be executed. If the pending calibration flag is not set, the data manager 206 sets the pending calibration flag (block 408) and begins calibration of the output device 108 (block 410). Calibration may include, for example, verifying a process control parameter, adjusting a setting of the sensor(s) 114, etc. The data manager 206 then determines if the calibration is complete (block 412). Control remains at block 412 until calibration is complete. Once calibration is complete, the data manager 206 removes the pending calibration flag (block 414). The data manager 206 sends the calibration information (e.g., data resulting from the calibration, information from the calibration request, etc.) to the database 208 and the database stores the calibration information (block 416). The data manager 206 then sets an updated information flag indicating that updated information has been generated and/or stored at the output device 108 (block 418). Control then returns to block 402.

FIG. 5 is a flow diagram of an example method of providing calibration information from the example output device 108 of FIG. 2. Initially, the data manager 206 receives a request for updated information from the controller 120 and/or the field device 130 via the first port 202 and/or the second port 204 (block 502). The request may be received in response to, for example, a setting of an updated information flag by the data manager 206 (described above in connection with FIG. 4). Once the data manager 206 receives the request for the updated information, the data manager 206 obtains the updated information from the database 208 (block 504). The data manager 206 returns the updated information to the controller 120 and/or the field device 130 via the first port 202 and/or the second port 204 (block 506). The data manager 206 then removes the updated information flag (block 508). Control then returns to block 502.

Figure 6:
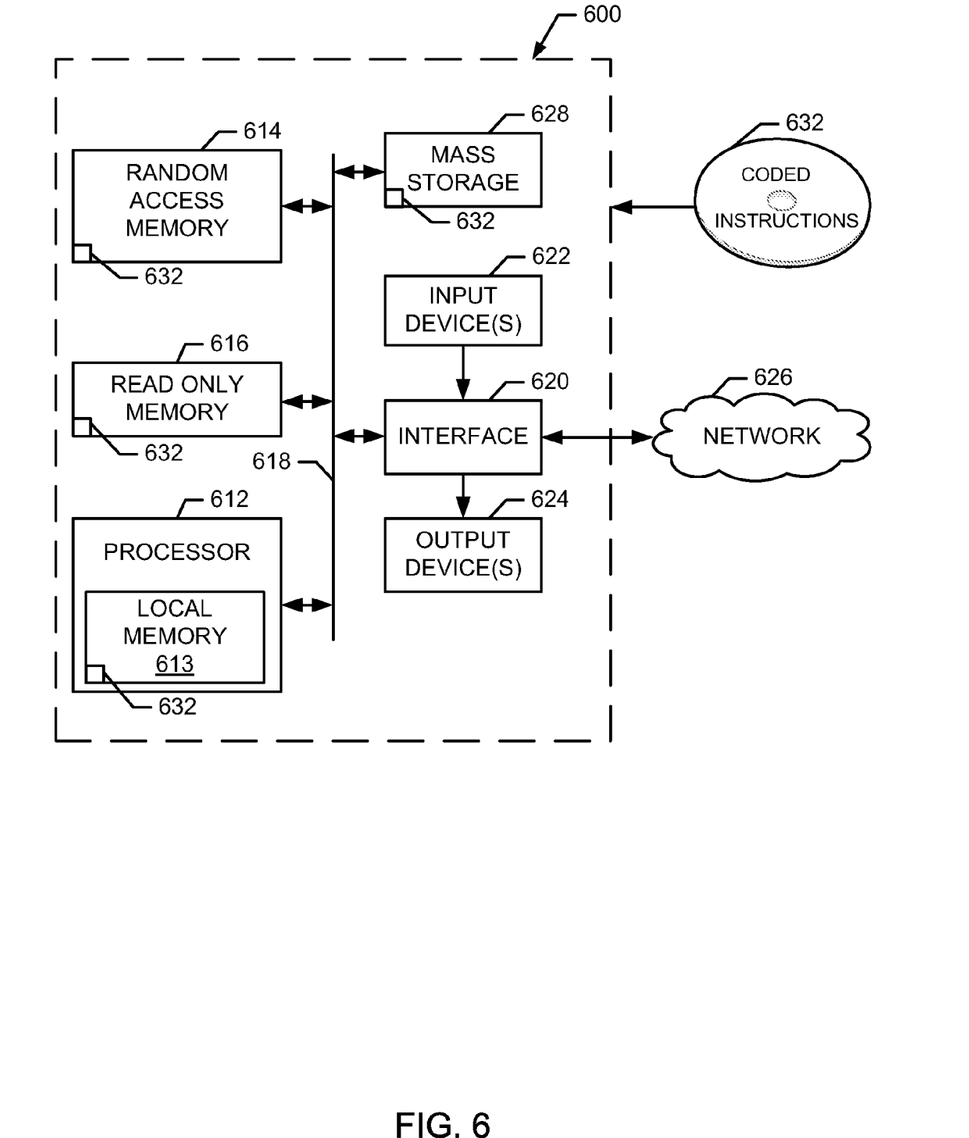
FIG. 6 is a block diagram of an example processor platform that may be used to implement the example methods and apparatus disclosed herein.

FIG. 6 is a block diagram of an example processor platform 600 capable of executing the methods of FIGS. 3, 4, and/or 5 to implement the example first port 202, the second port 204, the data manager 206, the sensor 208, the sensor 210, the sensor 212, the database 214, the display 216, and/or, more generally, the example output device 108 of FIG. 2. The processor platform 600 can be, for example, a server, a personal computer, an Internet appliance, a set top box, or any other type of computing device.

The processor platform 600 of the instant example includes a processor 612. For example, the processor 612 can be implemented by one or more microprocessors or controllers from any desired family or manufacturer. The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), etc.). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives. The mass storage device 628 may implement a local storage device.

Coded instructions 632 to implement the methods of FIGS. 3, 4, and/or 5 may be stored in the mass storage device 628, in the local memory 613, in the volatile memory 614, in the non-volatile memory 616, and/or on a removable storage medium such as a CD or DVD.

What is claimed is:

1. A method comprising:
   communicatively coupling a first device to an output device via a first port;
   communicatively coupling a second device to the output device via a second port;
   implementing a first configuration of the output device based on a first configuration request from the first device;
   sending the first configuration from the output device to the second device to update the second device;
   generating, with a data manager of the output device, a first notification based on a status of the output device;
   sending the first notification from the output device to the second device;
   generating, with the second device, a second notification based on information received from the output device, the information including the first notification; and
   sending one or more of the first configuration, the first notification, or the second notification from the second device to a third device.

2. The method of claim 1, wherein the first configuration includes data to implement a calibration of the output device.

3. The method of claim 1, wherein the first device is at least one of a field device associated with the output device or a host system associated with the output device.

4. The method of claim 1, wherein the first device is a field device and the second device is a host system.

5. The method of claim 1, further comprising:
   setting an information flag, the information flag indicating that the first configuration has been stored in the output device.

6. The method of claim 5, wherein the first configuration includes an identifier of the first device that provided the first configuration request.

7. The method of claim 5, further comprising:
   sending the first configuration to the second device based on the information flag; and
   removing the information flag.

8. The method of claim 5, wherein sending the first configuration from the output device to the second device to update the second device occurs when the information flag is set.

9. The method of claim 5, further comprising displaying the first configuration at the output device.

10. An output device comprising:
    a first port adapted to communicatively couple to a first device;
    a second port adapted to communicatively couple to a second device; and
    a data manager to:
      generate a first notification based on a status of the output device;
      send the first notification to the second device;
      receive first and second configuration requests from the respective first and second devices, the second device to generate a second notification based on information received from the output device and to send one or more of the first configuration, the first notification, and the second notification to a third device, the information including the first notification;
      implement a first configuration of the output device based on the first configuration request; and
      send the first configuration to the second device to update the second device.

11. The output device of claim 10, wherein the first configuration includes data to implement a calibration of the output device.

12. The output device of claim 10, wherein the first device is at least one of a field device associated with the output device or a host system associated with the output device.

13. The output device of claim 10, wherein the first device is a field device and the second device is a host system.

14. The output device of claim 10, wherein the data manager is to give the first port priority over the second port.

15. The output device of claim 10, wherein the data manager is to:
    set an information flag, the information flag indicating that the first configuration has been stored.

16. The output device of claim 15, wherein the first configuration includes an identifier of the first device that provided the first configuration request.

17. The output device of claim 15, wherein the first configuration includes a characteristic of a sensor.

18. The output device of claim 15, further comprising a display to display the first configuration.

19. The output device of claim 15, wherein the data manager is to:
    send the first configuration to the second device to update the second device in response to a request from the second device to the output device for the first configuration based on the information flag; and
    remove the information flag.

20. The output device of claim 15, wherein the data manager is to send the first configuration to the second device when the information flag is set.

21. A method comprising:
    receiving, at a data manager of an output device, a first configuration request from a first device communicatively coupled to the output device via a first port;
    receiving, at the data manager, a second configuration request from a second device communicatively coupled to the output device via a second port;
    implementing a first configuration at the output device based on the second configuration request;
    sending the second configuration data to the first device via the first port to update the first device;

generating, with the data manager of the output device, a first notification based on a status of the output device;

sending the first notification from the output device to the second device;

generating, with the second device, a second notification based on information received from the output device; and sending one or more of the second configuration, the first notification, or the second notification from the second device to a third device.

22. The method of claim 21, further including determining configuration information based on the second configuration request, the configuration information including an identifier of the second device.

23. The method of claim 22, wherein the second device is a field device.

24. The method of claim 1, wherein the first configuration request is associated with at least one of adjusting a setting of a sensor, verifying a process control parameter, or performing a control process calculation.

* * * * *